April 24, 1962 W. F. LASER ET AL 3,031,199
ROTARY SEAL
Filed Aug. 19, 1958
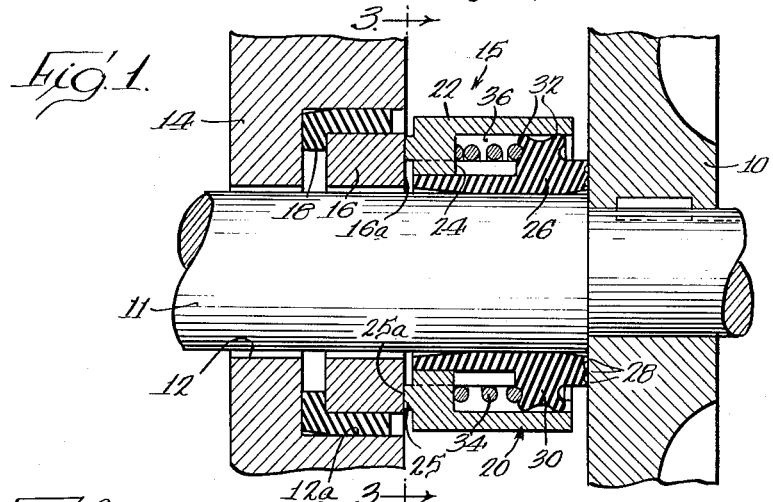
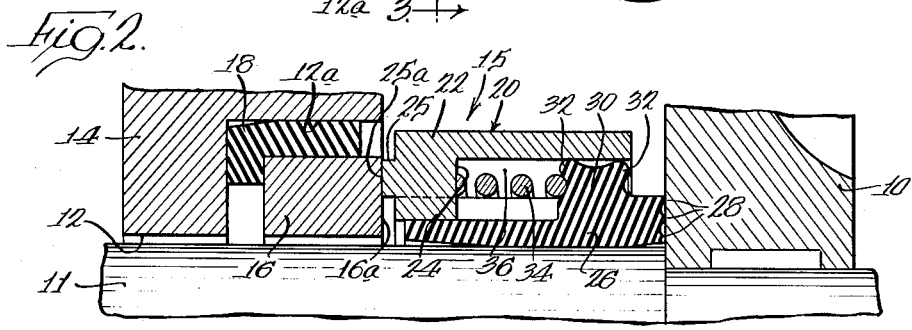
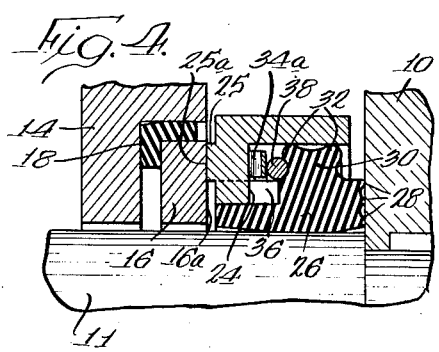
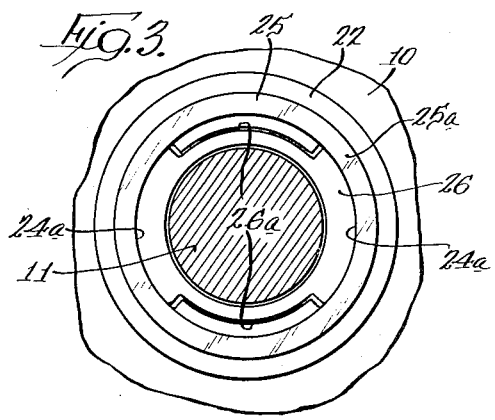
INVENTORS.
William F. Laser
Kermit D. Yost
BY Carlson, Pitzner,
Hubbard & Wolfe
Attys.

though the invention will be described in considerable detail...

United States Patent Office 3,031,199
Patented Apr. 24, 1962

3,031,199
ROTARY SEAL
William F. Laser, Evanston, and Kermit D. Yost, Skokie, Ill., assignors to City National Bank and Trust Company of Chicago, as trustee under the Cartridge Type Seal Liquidation Trust
Filed Aug. 19, 1958, Ser. No. 756,022
3 Claims. (Cl. 277—86)

The present invention relates to mechanical seals of the type intended for effecting a fluid-tight seal between relatively rotatable parts. It finds especial, though by no means exclusive, utility in fluid pumps and motors. More particularly the invention relates to seals of the type intended to prevent the escape of fluid along a shaft past a housing wall through which the shaft extends.

It is a general object of the invention to provide an effective rotary seal of the foregoing type which is of exceedingly simple construction embodying few parts, which permits of economical manufacture by quantity production methods and at the same time is durable, requires no maintenance, and which possesses improved life and sealing characteristics even under relatively extreme operating conditions.

It is a further object to provide in a rotary seal an improved construction and arrangement embodying a single simple spring, insuring the maintenance of fluid-tight seals between its rotor assembly elements and between them and the stator and rotating members in connection with which the seal is operatively installed.

The objects of the invention thus generally set forth, together with other objects and ancillary advantages, are attained by the constructions and arrangements shown by way of illustration in the accompanying drawing, in which:

FIGURE 1 is a central longitudinal section through a seal embodying the features of the present invention.

FIG. 2 is a fragmentary longitudinal section adapted from FIG. 1, on a somewhat enlarged scale, and illustrating slightly different relative positions of certain elements.

FIG. 3 is a transverse section taken substantially in the plane of line 3—3 in FIG. 1.

FIG. 4 is a view similar to FIG. 2 but showing a modified form of seal embodying the features of the present invention.

While the invention has been illustrated and will hereinafter be described in considerable detail in connection with certain preferred embodiments, it will be understood that it is not thereby intended to limit the invention to the specific forms disclosed. On the contrary, it is intended to embrace all modifications and alternative constructions falling within the spirit and scope of the invention as expressed in the appended claims.

Referring more particularly to the drawing, there fragmentarily shown is a member 10, such for example as the impeller of a pressure fluid operated device, that is mounted upon and keyed for rotation with a shaft 11. The shaft extends through an opening 12 in the wall of a housing 14. A rotary seal, generally designated 15 and constructed according to the teachings of the present invention, seals the shaft and rotating member within the housing to prevent the escape of fluid under pressure from the housing along the rotatable shaft.

The seal 15 includes a stator or non-rotating element in the form of an annular ring 16. The stator 16 surrounds the shaft 11 and is received in a counter bore 12a concentric with the opening 12 wherein it is retained by a sealing ring or grommet 18. Preferably, the stator 16 is formed of a ceramic material or of steatite, and the sealing ring 18 is formed of rubberlike material such as buna-N or neoprene. The stator 16 is provided with a radially-disposed sealing face 16a.

The seal 15 also includes a rotor assembly which is generally denoted by reference numeral 20. The rotor assembly is adapted to be mounted upon the shaft 11 for rotation therewith and is interposed between the stator 16 and the rotating member 10 of the illustrative device.

The rotor assembly 20 includes a rotor 22 of generally cylindrical shape having a bore 23 therein with an internal annular flange 24 adjacent one end thereof. The rotor 22 terminates in spaced relation to the transverse face of the rotary member 10. Integral with the flange is a longitudinally projecting annular shoulder 25 having a radial sealing face 25a for intimate rotary engagement with the juxtaposed sealing face 16a of the stator 16. Each of these sealing faces is accurately machined as by lapping so as to be smooth and flat to produce a type of positive rotary seal well known in the art when the faces are urged together.

The rotor can be formed of a variety of materials including carbon, sintered bronze, nickel-steel alloy and the like. It will be apparent, however, that the choice of both the stator and rotor materials should take into account contemplated operating conditions including the nature and temperature of the contained fluid.

To secure and positively seal the rotor assembly to the shaft 11, a sleeve 26 is provided. The sleeve 26 is fashioned of resilient material such as buna-N or neoprene, and it has a normal internal diameter slightly less than the diameter of the shaft 11 so as to snugly and sealingly grip the shaft when it is pressed into place upon the shaft. If desired to facilitate installation of the sleeve 26 upon the shaft its bore can be outwardly tapered a slight amount at its ends as shown. In the illustrative device the transverse outer face of the sleeve is provided with spaced annular ridges 28 for sealing engagement with the transverse face of the rotating member 10, that is fixed to the shaft 11, thereby further insuring against leakage of fluid along the shaft within the sleeve 26.

The sleeve 26 is telescopingly received within the bore 23 of the rotor 22 and sealingly engages the bore wall. For this purpose the sleeve 26 is provided with a peripheral flange 28 adjacent its end that is opposite the rotor flange 24, and the two flanges are spaced apart. The sleeve flange 28 is fashioned to define a pair of longitudinally-spaced concentric ribs 32 which snugly engage the wall of the rotor bore 23 to seal against fluid leakage therebetween.

The rotor 22 and the sleeve 26 are non-rotatively coupled so that the rotor is locked for rotation with the shaft 11. To this end, and as can best be seen in FIG. 3, the outer surface of the sleeve adjacent its forward end and the inner surface of the rotor flange 24 are complementally grooved, as indicated at 26a and 24a, respectively, for interfitting engagement.

The present invention contemplates the accommodation of longitudinal dimensional changes as might result, for example, from temperature variations, wear, or the like, without impairment of sealing effectiveness. To this end the rotor 22 and sleeve are relatively movable longitudinally and a spring 34 is interposed between the rotor 22 and the sleeve 26. The spring 34 biases these elements of the rotor assembly 20 apart to urge the rotor sealing surface 25a into engagement with the stator sealing surface 16a. In so acting it bears against the sleeve flange 30 pressing the adjacent rib 32 firmly against the wall of the rotor bore 23 and the ridges 28 against the rotating member 10.

Desirably the grooves 24a and 26a are dimensioned both as to width and depth so as to provide a relatively loose fit, as shown somewhat exaggerated in FIG. 3. This guides but prevents binding upon relative longitudinal movement between the sleeve 26 and rotor 22.

It will be apparent from the foregoing that the sleeve 26 is of external L-shaped cross section and the rotor is of reversed or internal L-shaped cross section. These two elements being telescoped together, thus define an enclosed annular space or chamber 36 therebetween within which the spring 34 is disposed. Further it will be seen that the seal between the faces 16a and 25a and between the ribs 32 of the sleeve flange 30 and the wall of the rotor bore 23 exclude fluid from the space 36. As a consequence the spring 34 is protected from possible deleterious effects that might result from exposure to the fluid contained within the device equipped with the instant seal.

One skilled in the art will appreciate that seals embodying the instant invention permit of numerous alternative constructions without departure from its teachings. For example, the embodiment detailed above incorporates a spring 34 which is of helical form. However, to fit within a more limited space, an annular spring of the so-called "Belleville" type could be employed. Alternatively, and as shown in FIG. 4, a spring in the form of a wavy, resilient, annular washer 34A could be utilized with the interposition of a suitable pressure ring 38 between it and the sleeve flange for effecting uniform application of its force thereto to insure sealing of the flange with the rotor bore wall. In this modified form the remainder of the seal components remain functionally the same since the only significant alteration in this form from that detailed above is in longitudinal dimension. In FIG. 4, therefore, the remainder of the reference numerals have been retained.

From the foregoing it will be apparent that a seal constructed in accordance with the teachings of the present invention are readily adaptable to various environments with unimpaired sealing effectiveness. Of particular practical significance is its simplicity for since including the stator mounting ring there are but five parts to the device. Each of these parts, with the exception of the biasing spring, can be made by quantity production molding from readily available, inexpensive materials. Further no complicated assembly operations or auxiliary devices are required.

We claim as our invention:

1. For use with a shaft extending through an opening in a housing, a seal comprising, in combination, an annular stator adapted to surround the shaft and to be sealed within the housing opening, and a rotor assembly including a rotor having a bore therein and a resilient sleeve for telescoping over said shaft and sealingly gripping the same and telescoped within said rotor, said rotor and said stator having radially disposed engaged sealing surfaces, said rotor having an internal annular flange adjacent one end thereof, said sleeve having a peripheral flange thereon adjacent the end thereof opposite said rotor flange and sealingly engaging said rotor yet permitting relative longitudinal movement therebetween, said rotor flange and the juxtaposed surface of said sleeve having complemental interfitting grooves for coupling said rotor and sleeve in longitudinally movable non-rotative relation, said rotor and sleeve and their respective flanges defining an enclosed annular space therebetween, and a spring disposed within said space and acting in expansion upon said flanges for urging said sleeve flange into sealing engagement with said rotor and for urging said stator and rotor sealing surfaces together.

2. For use with a shaft extending through an opening in a housing, a seal comprising, in combination, an annular stator adapted to surround the shaft and to be sealed within the housing opening, and a rotor assembly including a rotor having a bore therein and a resilient sleeve having a bore therethrough normally of a diameter less than that of the shaft for sealingly gripping the shaft, and said sleeve being telescoped in longitudinally movable and non-rotatively coupled relation within said rotor bore, said rotor and said stator having radial juxtaposed sealing surfaces, said resilient sleeve having a peripheral flange thereon with a rib on the outer surface of said flange for engagement with the rotor bore wall and spring means interposed between said rotor and said sleeve flange acting in expansion for urging said stator and rotor sealing surfaces together and said sleeve flange rib into sealing engagement with the bore wall.

3. For use with a rotating member presenting a transverse surface and fixed upon a shaft extending through an opening in a housing, a seal comprising, in combination, an annular stator adapted to be disposed about the shaft and sealed within the housing opening, and a rotor assembly interposed between the rotating member and said stator and including a rotor having a bore therein and a resilient sleeve adapted to sealingly grip the shaft and telescoped in longitudinally movable and non-rotatively coupled relation within said bore, said sleeve having spaced ridges on one end thereof adapted to engage the transverse surface of the rotating member and having a peripheral flange thereon with a rib on the outer surface of said flange engageable with said rotor bore wall, said rotor and said stator having juxtaposed sealing surfaces, and a spring interposed between said rotor and said sleeve for urging said rotor sealing surface into engagement with said stator sealing surface, said sleeve ridges into sealing engagement with the transverse surface of the rotating member, and for urging said rib into sealing engagement with the bore wall.

References Cited in the file of this patent

UNITED STATES PATENTS

| | | |
|---|---|---|
| 2,305,726 | Meyer | Dec. 22, 1942 |
| 2,365,046 | Bottomley | Dec. 12, 1944 |
| 2,467,543 | Voytech | Apr. 19, 1949 |
| 2,646,296 | Destoumieux et al. | July 21, 1953 |
| 2,702,203 | Sefren et al. | Feb. 15, 1955 |
| 2,806,720 | Meyer | Sept. 17, 1957 |

FOREIGN PATENTS

| | | |
|---|---|---|
| 499,775 | Great Britain | Jan. 30, 1939 |